Patented Mar. 11, 1924.

1,486,214

UNITED STATES PATENT OFFICE.

GEORGE FRED YESSLER, OF PORT CHESTER, NEW YORK.

COMPOSITE REFRACTORY METALLIC BODY.

No Drawing.          Application filed February 28, 1920.   Serial No. 362,074.

*To all whom it may concern:*

Be it known that I, GEORGE FRED YESSLER, a citizen of the United States, and resident of Port Chester, in the county of Westchester and State of New York, have invented certain new and useful Improvements in Composite Refractory Metallic Bodies, of which the following is a specification.

My invention concerns composite refractory metallic bodies the principal refractory constituent of which is tungsten, and a process for producing the same. The object of my invention is to provide bodies of the said character which possess new and desirable properties for various uses in the arts.

The composite metallic bodies obtained according to my invention consist of tungsten containing foreign substances associated or alloyed therewith and otherwise intimately embodied therein, which foreign substances impart to the said composite bodies properties not possessed by tungsten metal as such and by the possession of which qualities the said bodies are broadly distinguished from bodies composed of substantially pure tungsten.

One of the properties which distinguish the composite bodies obtained according to my invention from bodies composed of substantially pure tungsten, and which it is my principal object to attain, is their superior hardness, which renders them more advantageous for certain uses than are such bodies of substantially pure tungsten. It may be remarked however, that the superior hardness possessed by the composite bodies obtained according to my invention is not due to an increase in their melting point beyond that of tungsten metal, because the melting point of my composite bodies is distinctly lower than the melting point of tungsten metal, so that for purposes where the melting point of the material is the prime consideration, the bodies produced according to my invention would probably not be as advantageous to use as bodies of substantially pure tungsten. However, though the melting point of my composite bodies is less than that of tungsten itself, yet their softening point under the influence of heat is increased beyond that of tungsten, so that they are more efficient in withstanding the effect of a continuous high temperature to which they may be subjected in practical use, than would be bodies of tungsten metal.

Composite bodies of this character can be brought into any desired shape adapted for use in the arts, such as rods, sheets, wires and the like, by the usual mechanical operation and devices used for that purpose, such as hammering, rolling, drawing or the like, but owing to their hardness they are much more difficult to work than tungsten itself. It is not possible to obtain workable bodies unless certain specific conditions are followed during their preparation and subsequent treatment, as will be more particularly set forth hereinafter.

As far as the chemical constitution of my composite bodies is concerned, it has been my aim to produce a body of this character partaking alike of the nature of an alloy and that of a mixture, by introducing into the tungsten metal substances, some of which I have reason to believe, form, at least partially, an alloy with the tungsten metal, while others remain in the final body partly, if not entirely, in substantially the same form as they were originally introduced into the starting material, and are thus only mechanically distributed throughout the resulting body in a very finely distributed condition. Thus the composite bodies produced according to my invention may perhaps be properly termed composite refractory alloys.

One of the reasons which lead me to believe that alloys of other metals with tungsten are present in the composite bodies obtained according to my invention, is the distinct lowering of their melting point, below that of tungsten metal.

The metal which I have found most advantageous to use as the main alloy forming component of my refractory bodies is metallic iron. I consider the presence of this metal as essential and take particular care that the same is always present in the starting material in sufficient quantity. By thus being able to utilize this metal advantageously as a component of composite tungsten bodies which can be exposed to continued high temperatures, I have departed radically from the prior art in the production of bodies of substantially pure tungsten where great care was taken to purify the starting material to a very high degree and particularly to remove the iron from the same, because the presence of a metal having a low melting point compared to that of the tungsten, was considered highly detrimental.

As non-alloy forming components of my composite bodies I use refractory oxides, which I prefer to add to the starting material either in the form of oxides or in that of compounds, which on heating are decomposed with the formation of oxides. Though I believe, that during the process of formation of my composite bodies a portion of the said oxides is reduced to metal and also alloys with the tungsten, yet another portion remains therein in combination with oxygen and does not alloy with the tungsten, but remains homogeneously distributed throughout the metallic body in a very finely divided condition. One of these refractory oxides, which I have found advantageous for my purposes to use, is oxide of calcium, and I have reason to believe that the presence of calcium compounds in my composite bodies is very desirable, though perhaps not absolutely necessary, if other oxides are present.

In addition to the above named oxide of calcium, I preferably use other refractory oxides, such as silica and alumina, a certain portion of which remains as such in my composite body. In cases where I desire that a still greater portion of the oxide compounds remains in the finished product, I may replace the silica and alumina or one of them partly if not entirely by more refractory oxides, such as those of the rare earth metals, namely zirconia, thoria or the like, which are more difficult to reduce than the said former oxides, particularly at the comparatively low temperatures which I employ for the formation of my composite bodies, and of which therefore a greater portion is likely to remain in the composite bodies in mechanical intermixture therein.

The amount of the said elements to be employed, depends, of course, on the particular purpose, for which the resulting composite bodies are employed, and particularly on the hardness which they are desired to have. If too large an amount is used, the composite body is so hard, that it can no longer be worked by mechanical means. If the amount present is too small, the desired results are not obtained. Good results will be obtained with bodies having the following composition: Tungsten, 98.78%, iron, .37%, silicon, .032%, calcium, .27%, thorium, .42%, oxygen, .128%.

While I do not desire to limit myself to the precise figures, I am of the opinion, that the total amount of non-tungsten elements present should not be less than .75 per cent nor more than five per cent.

As stated above, composite bodies obtained according to my invention are substantially harder than bodies of substantially pure tungsten, and are also much harder to work, when the same are subjected to the usual metal working operations, such as hammering, rolling and the like, and in order to be workable at all, they must be prepared with particular care. It is therefore essential, that in addition to their chemical composition, particular attention be paid to their physical structure, which is controlled by the density of the material in its different stages of preparation as well as by the temperature to which the composite bodies are subjected during their formation and subsequent thereof, while they are being brought into the final shape desired, as will be more particularly set forth hereinafter.

In carrying out my invention, I preferably use as starting material tungsten oxide, $WO_3$, with which I intimately incorporate oxide of iron, oxide of calcium and other refractory oxides such as silica and alumina, the last named, if desired, being partly or wholly replaced by refractory oxides of the rare earth metals, such as zirconia, thoria or the like. It is understood that I do not limit myself to the specific compounds of the said elements mentioned above, but that I also may use the tungstates or any other compounds thereof which are suitable for my purpose, and particularly such compounds which are decomposed by heat with the formation of oxides. I may also use impure tungstic oxide already containing all or part of the foreign substances which I desire to have present in the resulting composite body and only add such as are not present in the raw material or are present in insufficient quantity. The mixture is made in any suitable manner, preferably by adding one or the other constituent to the tungstic oxide in the form of a compound soluble in water or ammonia, and is then dried on a sand bath. The resulting product is then crushed and passed through a 100 mesh bolting cloth. I find it necessary to pay particular attention to the density of this product, which should preferably be such that the weight of one cubic inch thereof is from eight and one-half to ten grams.

In order to drive off the water of composition and other volatile matters that may be present, the mixture is then calcined in the usual manner, preferably in a gas furnace after having been introduced into a silica crucible. This operation is very important and must be conducted and watched with great care, so as to obtain a product of the proper density. It is necessary to vary the length of time and the temperature of calcination in successive operations so as to obtain products which differ from each other in density, though being of uniform density themselves, that is to say, one product may have a density equivalent to a weight of 20 grams per cubic inch, while another product may have a density of 30 grams to the cubic inch, etc. I aim at obtaining in successive operations calcined powders which have densities which range from 18 to 45 grams weight per cubic inch. If the density of the calcined product is less than 18 grams per cubic inch or goes beyond 45 grams per cubic inch, such products cannot be used for the formation of my composite bodies, because the latter then prove unsuitable for working by mechanical means, particularly if the mechanical working process has to be carried on until the material operated upon has a comparatively small cross section.

The calcined material is then introduced into a tube of refractory material, preferably of alundum, and the said tube is placed in a furnace, where it and the material contained therein can be brought to a comparatively high temperature either by means of gas heat or by electrical means. During this operation hydrogen gas is passed through the furnace for the purpose of effecting the reduction of the tungstic oxide to metallic tungsten and also reducing such other metallic oxides present in the mixture as may be wholly or partially reducible by hydrogen, such for instance as the oxide of iron. During this operation I find that the best results are obtained by not simply passing the hydrogen through the interior of the tube, as is usually done, but also allowing it to play on the outside of the tube, so that a portion of the gas may enter the interior of the same through the walls. It is also necessary for the purpose of my invention, that the reducing operation be carried out with great care, so as to produce in successive operations a series of different densities of the resulting product. For this purpose it is necessary to vary the density of the oxide powder which is subjected to the reducing operation, the rate of flow of the hydrogen, the time of treatment and the temperature of the furnace. I have found it preferable in order to successively carry out my invention, to produce grades of metal differing from each other in density and ranging from a density equivalent to a weight of 30 grams per cubic inch to 55 grams per cubic inch. The resulting products are carefully classified according to their density and kept in separate containers.

The next step of my process is the compounding of a mixture of the reduced powders which mixture must be of the proper consistency and density, so that the same can be successfully compressed under high pressure in the usual manner employed in the art. This is a very important step of my process and it is necessary that the same be carried out with great care. As the bodies obtained according to my invention are difficult to work at best, every precaution must be taken to insure their being in the best possible condition. I have found that it is necessary to make a very careful selection of a plurality of grades of different density, say suitable powders having 15 different degrees of density, to be incorporated into the mixture, in order to obtain a mixture which will give me the desired results. I have obtained good results from a mixture of powders of different density, so that the average density of the resulting mix was 42 grams per cubic inch, though I believe that mixtures are still workable which have an average density as low as 39 and as high as 48 grams weight per cubic inch. I have found that it is not possible by taking only one grade of the reduced powder, say one having a density of 42 grams weight per cubic inch, to obtain a pressed body of sufficient strength and perfection, so that the same can be successfully subjected to the subsequent operations. If only a few different grades of density are incorporated into the mixture, the same disadvantages are encountered, but not in such a marked degree.

The next step of my process is the compressing of the mixture thus compounded into the shape of a rod or other body of suitable dimensions by hydraulic pressure or any other suitable means, which operation is carried out in the usual manner, after the mixture has been introduced into a mold of suitable dimensions. I find it advantageous to apply pressure to the mold from two sides, that is horizontally and vertically in the order named.

The body thus compressed is then introduced into a furnace, where the same is subjected to a moderately high temperature, for the purpose of effecting a preliminary consolidation and at least partially causing a portion of the foreign substances present, and particularly the iron, to alloy with the tungsten. The temperature during this operation is advantageously kept at about 1200 degrees C., though the same may be somewhat lower or higher without causing any material disadvantage. The time of treatment may be varied from ten minutes to about an hour, and I have not found any advantage by prolonging the heating beyond this time.

The treatment is then continued by subjecting the body to a comparatively high temperature, preferably by passing an electric current through the same in vacuo or in an inert atmosphere in the usual manner. Great care must be taken in this operation to carefully regulate the temperature of treatment. When the proper temperature has been used, the structure of the resulting composite body will be found to be such, that its fracture is composed of small grains. If the temperature has been too high, the grains will be large, and the body then proves unworkable by mechanical means. If too low a temperature has been used, the body is not sufficiently consolidated and formed, and it can also not be subjected to mechanical working. The temperature must be kept as low as is consistent with obtaining the desired results and is in all cases materially below that to which substantially pure tungsten would be subjected, if it were treated in this manner, because the melting point of my composite body is distinctly lower than that of tungsten and it is necessary to keep the treating temperature even considerably below the melting point of my composite body. I determine the proper treating temperature by ascertaining the melting point of my composite bodies and keep the treating temperature at least ten and preferably fifteen per cent below the same.

The bodies obtained in the manner described are in such a condition, that they can be subjected to the usual metal working operations, that is, they can be hammered out on a trip hammer in a heated condition to a very considerable extent, and can be extended by rolling swaging, hammering and drawing in the usual manner. In other words, they represent in all respects the characteristics of a workable body. Owing to their hardness, however, the mechanical working operations must be conducted with great care and while the bodies are maintained at a comparatively high temperature during all stages of the working, until they have reached the desired diameter. In particular, I find it necessary to guard against the appearance of fibres, and to keep the working temperature above that at which fibers are produced, until the product has arrived at a very small diameter. It is also necessary in the mechanical working operations to use vary small gradations for the successive reduction of cross-section, such as are used in practice only for the hardest metals.

Having thus described my invention, I claim:

1. The process of producing composite refractory metallic bodies consisting of tungsten containing iron alloyed therewith and having refractory oxides homogeneously incorporated therein, the said bodies having a melting point lower than that of substantially pure tungsten, which consists in incorporating oxygen containing compounds of iron and of elements which on heating form difficultly reducible refractory oxides, with tungsteniferous material, heating the mixture thus obtained to convert the said compounds into oxides, subjecting the mixture to a reducing operation, producing reduced materials of different densities, compounding a mixture from a plurality of such reduced materials of different density, forming a compressed body from the said mixture, causing the said body to undergo a preliminary formation by heating it to a moderately high temperature and completing the formation by heating it up to a high temperature, which temperature is materially below its melting point.

2. The process of producing composite refractory metallic bodies of tungsten containing iron alloyed therewith and having refractory oxides homogeneously incorporated therein, the said bodies having a melting point lower than that of substantially pure tungsten, which consists in incorporating oxygen-containing compounds of iron and of elements which on heating form difficultly reducible refractory oxides, with tungstic oxide, heating the mixture thus obtained to convert the said compounds into oxides, subjecting the product thus obtained to a reducing operation, producing reduced materials of different density, compounding a mixture from such reduced materials of different density, forming a compressed body from the said mixture, causing the said body to undergo a preliminary formation by heating it to a moderately high temperature, and completing the formation by heating it up to a high temperature, which temperature is materially below its melting point.

3. The process of producing composite refractory metallic bodies consisting of tungsten containing iron alloyed therewith and having refractory oxides homogeneously incorporated therein, the said bodies having a melting point lower than that of substantially pure tungsten, which consists in heating tungsteniferous material containing oxygen-containing compounds of iron and of elements which on heating form difficultly reducible refractory oxides, subjecting the product thus obtained to a reducing operation, producing reduced materials of different densities, compounding a mixture from a plurality of such reduced materials of different density, forming a compressed body from the said mixture, causing the said body to undergo a preliminary formation by heating it to a moderately high temperature, and completing the formation by heating it to a high temperature, which temperature is materially below its melting point.

4. The process of producing composite refractory metallic bodies consisting of tungsten containing iron alloyed therewith and having refractory oxides homogeneously incorporated therein, the said bodies having a melting point lower than that of substantially pure tungsten, which consists in heating tungstic oxide containing oxygen-containing compounds of iron and of elements which on heating form difficultly reducible refractory oxides, subjecting the product thus obtained to a reducing operation, producing reduced materials of different densities, compounding a mixture from a plurality of such reduced materials of different density, forming a compressed body from the said mixture, causing the said body to undergo a preliminary formation by heating it to a moderately high temperature, and completing the formation by heating it to a high temperature, which temperature is materially below its melting point.

5. The process of producing composite refractory metallic bodies consisting of tungsten containing iron alloyed therewith and having refractory oxides homogeneously incorporated therein, the said bodies having a melting point lower than that of substantially pure tungsten, which consists in incorporating oxids of iron and difficultly reducible refractory oxides with tungstic oxides, subjecting the mixture to a reducing operation, producing reduced materials of different density, compounding a mixture of such reduced materials of different density, forming a compressed body from the said mixture, subjecting the compressed body to a preliminary formation by heating it to a moderately high temperature, and completing the formation by heating it to a high temperature.

Signed at New York city, in the county of New York and State of New York, this 17th day of February, A. D. 1920.

GEORGE FRED YESSLER.

Witnesses:
PAUL McJUNKIN,
M. M. MURPHY DREW.